L. M. YOUNG.
FOOT RETAINER FOR MOTOR VEHICLES.
APPLICATION FILED JUNE 10, 1915.
1,152,257.
Patented Aug. 31, 1915.
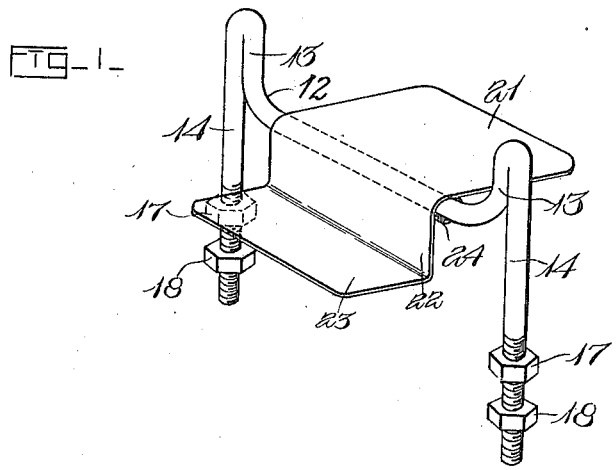
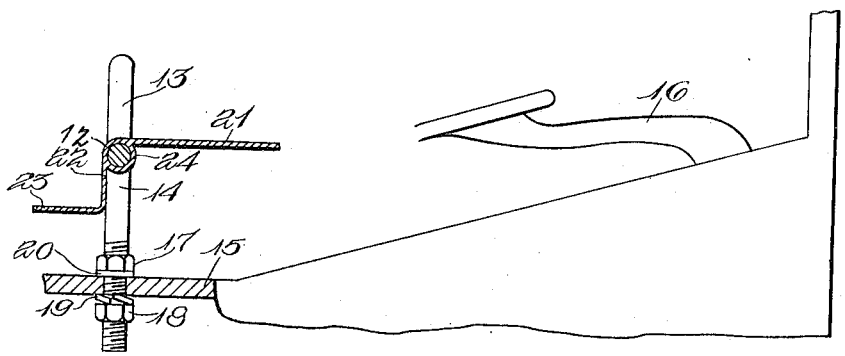
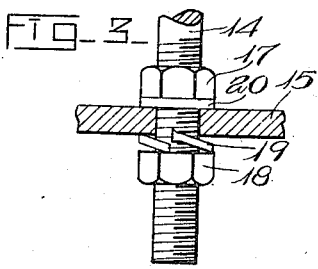
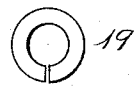
INVENTOR=
LOUIS M. YOUNG
By
ATTORNEYS

UNITED STATES PATENT OFFICE.

LOUIS M. YOUNG, OF BOSTON, MASSACHUSETTS.

FOOT-RETAINER FOR MOTOR-VEHICLES.

1,152,257.  Specification of Letters Patent.  Patented Aug. 31, 1915.

Application filed June 10, 1915. Serial No. 33,351.

*To all whom it may concern:*

Be it known that I, LOUIS M. YOUNG, a citizen of the United States, and resident of Boston, in the county of Suffolk and State of Massachusetts, have invented certain new and useful Improvements in Foot-Retainers for Motor-Vehicles, of which the following is a specification.

This invention is embodied in an attachment adapted to be conveniently and adjustably secured by a minimum expenditure of time and labor to the floor of a motor vehicle body at a point between the driver's seat and the usual foot-operated accelerator lever which projects above the floor and is movable by the fore part of the driver's foot, said attachment being adapted to retain the foot in its proper relation to the lever and constitute a fulcrum on which the foot may swing or rock in operating the lever, the adjustability of the attachment being such as to enable the height of said fulcrum above the floor to be varied to suit the driver.

Of the accompanying drawings forming a part of this specification: Figure 1 represents a perspective view of a foot retaining attachment embodying my invention; Fig. 2 represents a sectional view showing the attachment secured to the floor of a motor vehicle, a part of the floor being shown in section; Fig. 3 represents an enlargement of a portion of Fig. 2; Fig. 4 represents a plan view of the nut-retaining washer shown by Fig. 3.

The same reference characters indicate the same or similar parts in all the views.

In the preferred embodiment of my invention here shown, the fixed part of the attachment is composed of a single metal rod bent to form shown by Fig. 1, and comprising a horizontally extending rest 12, which constitutes the central portion of said rod, upright stops 13 formed by bending the rod upwardly at opposite ends of the rest, said stops projecting above the rest, and upright standards 14 formed by bending the rod downwardly from the upper portions of said stops, said standards being spaced apart and projecting downwardly from the stops and rest. The lower end portions of the standards 14 are screw-threaded and adapted to be inserted in holes formed for their reception in the floor 15 of a motor vehicle body at points between the driver's seat (not shown) and the usual foot-operated accelerator lever 16. With the threaded portion of each standard is engaged an upper nut 17 and a lower nut 18, said nuts being adapted to bear respectively on the top and bottom surfaces of the floor and to clamp the attachment to the floor. The nuts may be adjusted to locate the rest 12 at any height above the floor that may be required by the driver.

The rest is so located relatively to the lever 16 that it supports and forms a fulcrum for the lever-operating foot of the driver, the rest forming a support for the shank portion of the shoe on the operating foot, and a stop which opposes the breast of the shoe heel and limits the forward movement of the foot. The stops 13 projecting above the rest at opposite ends thereof prevent the foot from slipping sidewise in either direction from the rest. The distance between the rest 12 and the lever 16 is such that the fore part of the foot projects over the lever and is adapted to be swung downwardly to depress the lever, the rest acting as a fulcrum.

If desired, split and laterally bent nut-retaining washers 19 formed as shown by Figs. 3 and 4 may be interposed between the lower nuts 18 and the floor to prevent accidental turning of the lower nuts. Plain washers 20 may be interposed between the upper nuts 17 and the floor.

Figs. 1 and 2 show an angular pedal adapted to rock on the rest 12, and composed of a forwardly projecting tread portion 21, located above the rest and adapted to bear on the shank portion of the shoe sole, a heel-breast stop 22 projecting downwardly from the portion 21 and from the rest, and a rearwardly projecting tread portion 23 located below the rest and adapted to bear on the tread of the shoe heel. The pedal has a sleeve 24 fitted to turn on the rest 12. Said pedal affords an extended bearing for the shoe of the operator's foot and prevents such discomfort as might result from pressure of the shank portion of the sole directly against the rest 12 in case said shank portion is relatively thin. I do not limit myself however to the employment of the pedal and may omit the same.

It will be seen that the described foot rest supports the operator's foot in a definite relation to the lever 16, so that no care or strain is involved in keeping the fore part of the foot on the lever. Whenever therefore the vehicle body is jolted by passing over a stone the same upward movement is imparted to the foot as to the lever, so that the relative positions of the foot and lever remain unchanged, and there is no liability of the foot slipping from or temporarily losing control of the lever. The uniform control of the lever by the foot results in a steady control of the flow of gasolene by the lever, so that the engine runs smoothly and not spasmodically.

Having described my invention, I claim:

1. A foot retainer of the character stated, comprising a horizontally extending rest, upright stops at opposite ends of and projecting above said rest, parallel spaced-apart upright standards projecting downwardly from said stops at opposite ends of the rest, the lower portions of said standards being screw-threaded and formed to pass through bored orifices in a floor, and upper and lower floor-engaging nuts engaged with the screw threads of said standards, and permitting vertical adjustment of the retainer to vary the height of said rest and stops from the floor.

2. A foot retainer of the character stated, comprising a horizontally extending rest, upright stops at opposite ends of and projecting above said rest, parallel spaced-apart upright standards projecting downwardly from said stops at opposite ends of the rest and provided with floor-engaging means, and an angular pedal journaled on said rest and having a forwardly projecting tread portion, a downwardly projecting heel-breast stop and a rearwardly projecting tread portion.

In testimony whereof I have affixed my signature.

LOUIS M. YOUNG.